(12) United States Patent
White et al.

(10) Patent No.: US 11,070,481 B2
(45) Date of Patent: *Jul. 20, 2021

(54) PREDICTIVE MANAGEMENT OF A NETWORK BUFFER

(71) Applicant: Cable Television Laboratories, Inc., Louisville, CO (US)

(72) Inventors: Gregory C. White, Louisville, CO (US); Joey Padden, Boulder, CO (US); Takashi Hayakawa, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/531,487

(22) Filed: Aug. 5, 2019

(65) Prior Publication Data
US 2019/0356602 A1 Nov. 21, 2019

Related U.S. Application Data

(63) Continuation of application No. 15/627,859, filed on Jun. 20, 2017, now Pat. No. 10,374,963, which is a
(Continued)

(51) Int. Cl.
| | | |
|---|---|---|
| *H04L 12/823* | (2013.01) | |
| *H04L 12/26* | (2006.01) | |
| *H04L 12/875* | (2013.01) | |
| *H04L 1/18* | (2006.01) | |
| *H04L 29/06* | (2006.01) | |
| *G02B 6/293* | (2006.01) | |

(Continued)

(52) U.S. Cl.
CPC .......... *H04L 47/32* (2013.01); *G02B 6/29382* (2013.01); *H04L 1/1835* (2013.01); *H04L 43/0858* (2013.01); *H04L 47/56* (2013.01); *H04L 69/16* (2013.01); *H04N 21/64792* (2013.01); *H04L 43/0864* (2013.01); *H04N 21/647* (2013.01); *H04W 28/02* (2013.01)

(58) Field of Classification Search
CPC .......... H04L 12/40071; H04L 12/2647; H04L 12/2652; H04L 43/0829; H04L 43/0893; H04L 47/32; G02B 6/29382; H04N 21/647; H04N 21/64792

See application file for complete search history.

(56) References Cited

U.S. PATENT DOCUMENTS

| | | | |
|---|---|---|---|
| 9,686,201 B2 * | 6/2017 | White | ................. H04L 43/0858 |
| 10,374,963 B2 * | 8/2019 | White | ..................... H04L 69/16 |

(Continued)

OTHER PUBLICATIONS

Acmqueue, Controlling Queue Delay, Kathleen Nichols and Van Jacobson ,ACM, 2012, pp. 1-15.
(Continued)

*Primary Examiner* — Salvador E Rivas
(74) *Attorney, Agent, or Firm* — Great Lakes Intellectual Property, PLLC

(57) ABSTRACT

Predictive management of a network buffer is contemplated. The network buffer maybe predictively managed to control packet drop based at least in part on predicted sojourn time. The predicted sojourn time may be determined to predict time needed from an arriving packet to travel through a queue of the network buffer.

19 Claims, 4 Drawing Sheets

Related U.S. Application Data continuation of application No. 14/164,165, filed on Jan. 25, 2014, now Pat. No. 9,686,201.

(60) Provisional application No. 61/756,641, filed on Jan. 25, 2013.

(51) Int. Cl.
*H04N 21/647* (2011.01)
*H04W 28/02* (2009.01)

(56) References Cited

U.S. PATENT DOCUMENTS

| | | | |
|---|---|---|---|
| 2006/0114834 A1 | 6/2006 | Cheung | |
| 2009/0129313 A1 | 5/2009 | Tamura | |
| 2011/0299589 A1 | 12/2011 | Zhou | |
| 2012/0250678 A1* | 10/2012 | Sabella | H04L 47/564 370/352 |
| 2013/0016611 A1* | 1/2013 | Mang | H04W 72/1242 370/230 |
| 2013/0343398 A1* | 12/2013 | Sarca | H04L 47/32 370/412 |

OTHER PUBLICATIONS

Nichols, Kathleen and Jacobson, Van; "Controlling Queue Delay", Communications of the ACM, vol. 55 Issue 7, Jul. 2012, pp. 42-50.

\* cited by examiner

PREDICTIVE MANAGEMENT OF A NETWORK BUFFER

CROSS-REFERENCE TO RELATED APPLICATIONS

This application is a continuation of U.S. application Ser. No. 15/627,859 filed Jun. 20, 2017, which in turn is a continuation of U.S. application Ser. No. 14/164,165 filed Jan. 25, 2014, which in turn claims the benefit of U.S. provisional application No. 61/756,641 filed Jan. 25, 2013, the disclosures and benefits of which are hereby incorporated in their entireties by reference herein.

TECHNICAL FIELD

The present invention relates to managing network buffers, such as but not necessarily limited to network buffers, elements or other devices configured to temporarily queue packets or other data constructs prior to being subsequently communicated.

BACKGROUND

Buffering can be employed with network elements to minimize packet loss and to maintain efficient use of an egress link when an ingress link(s) supports a higher aggregate data rate than the egress link. Transmission Control Protocol (TCP) algorithms utilize congestion control algorithms that are "loss-based" in that they increase their transmission rate until they experience packet loss. In many network elements, packet loss is the result of buffer overflow, and (if the buffer is sufficiently sized) the result is that TCP effectively adjusts its average transmit rate to match the rate of the bottleneck link. However, another result of this approach is that the buffer at the head of the bottleneck link is kept nearly full during the course of the TCP connection. This nearly-full buffer creates a couple of problems for network performance. If the buffer is oversized relative to the bandwidth-delay product (BDP) of the egress link, which may be defined as the product of the data rate of the egress link and the expected average round-trip time for the TCP connections that will utilize it, then the latency created by this nearly-full buffer will have a significant, negative impact on the performance of interactive and latency sensitive traffic, such as web browsing, VoIP, video chat, etc. On the other hand, if the buffer is undersized relative to the BDP, then TCP performance may suffer, and the nearly-full buffer may not have sufficient space to handle traffic bursts, and may result in excessive packet loss and poor performance for new connections.

FIGS. 1-3 illustrate buffer occupancy diagrams where the buffer is oversized (FIG. 1), proportional (FIG. 2) and undersized (FIG. 3) relative to the BDP of a corresponding egress link. The graphs illustrate implementation of one type of TCP congestion control where a source automatically decreases packet transmission rates in response to determining a dropped packet and thereafter increases packet transmission rates in a linear fashion until determining a subsequently dropped packet. The packet drop is shown to occur for exemplary non-limiting purposes due to the buffer becoming overloaded and being unable to store a received packet where each corresponding packet drop is represented along the horizontal access with a value of "0". A saw-tooth pattern illustrates a percent occupancy of the buffer resulting from the source decreasing and then increasing packet transmission rates as a result of failing to receive a corresponding acknowledgement (acknowledgements may be sent on a per-packet basis or on a per-window basis (multiple packets)). A link utilization overlay illustrates corresponding usage of the egress link where a value of "0" indicates zero or under utilization and a value of "1" indicates full or desired utilization (the link may continue to be utilized while the source decreases packet transmission rates as queued packets are dequeued). The buffer occupancy should vary between 0% and 100% utilization when properly sized in order to avoid a standing queue (undesirable latency—see FIG. 1) and a buffer underrun (absence of packets to transmit resulting in a link idle ("0" link value)—see FIG. 3).

FIG. 4 illustrates a buffer occupancy diagram similar to those described above when control delay (CoDel) active queue management (AQM) is implemented with an oversized buffer. For purposes of illustration, FIG. 4 shows an initial portion in which the CoDel AQM is not active, and the buffer occupancy proceeds in a manner identical to FIG. 1, followed by a subsequent portion in which the CoDel AQM is active. In the subsequent portion, the CoDel AQM instigates packet drops, e.g., prior to buffer overflow, in order to prompt the source to decrease and then increase packet transmission rates using TCP congestion control, and thus reduce or eliminate the standing queue. The subsequent, CoDel AQM portion may begin to compensate for the TCP congestion control failing to compensate for the oversized buffer (standing queue) by controlling the buffer to drop packets when being dequeued (head drop), i.e., to prevent subsequent transport of the packet over the egress link. The buffer may be controlled to head drop packets in order to engage the TCP congestion control capabilities of the source, i.e., to cause the source to decrease and then increase packet transmission rates such that buffer occupancy varies according to the illustrated saw-tooth pattern. Optionally, the CoDel AQM portion may perform other operations besides head drops, such as by including information in the header of transmitted packets to prompt similar actions from the source (e.g. Explicit Congestion Notification (ECN) marking). For non-limiting purposes, the "drops" described herein are intended to include this or similar non-drop related activities sufficient to engage the TCP congestion control capabilities of the source.

The CoDel AQM related operations, which are shown to correspond with the subsequent portion in FIG. 4, require the buffer to add a timestamp or other time marker to packets traversing therethrough, which can be a complex and problematic process. One non-limiting aspect of the present invention contemplates facilitating operations similar to CoDel AQM, i.e., utilizing buffer-based or buffer-originating packet drops, such as but not necessarily limited to drops occurring prior to overload, to facilitate engaging TCP congestion control or other related control capabilities of a source.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
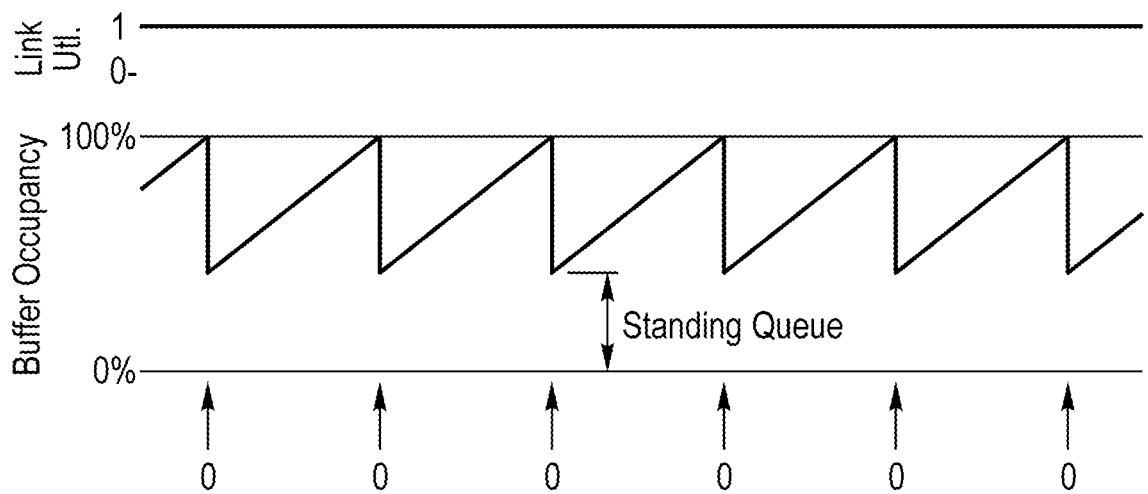
FIGS. 1-4 illustrate buffer occupancy diagrams.
Figure 2:
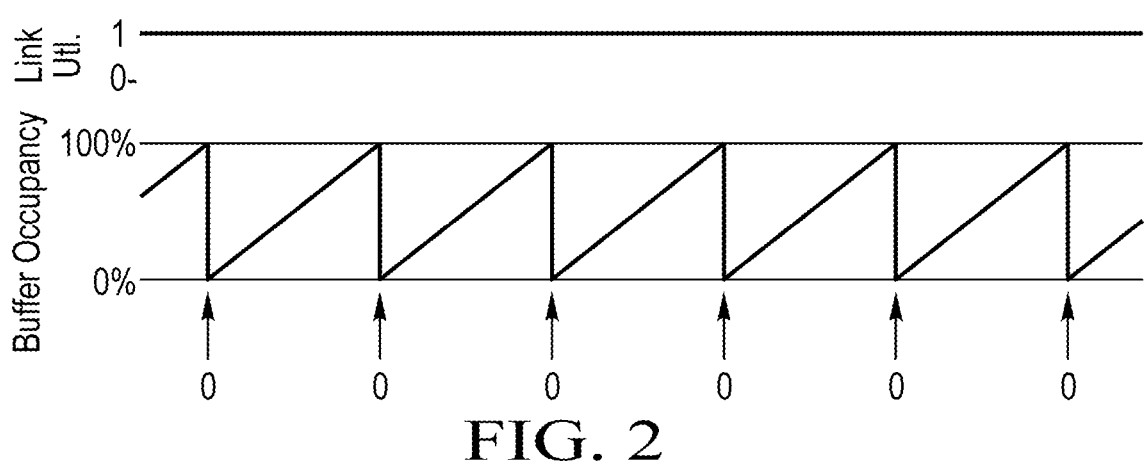
Figure 3:
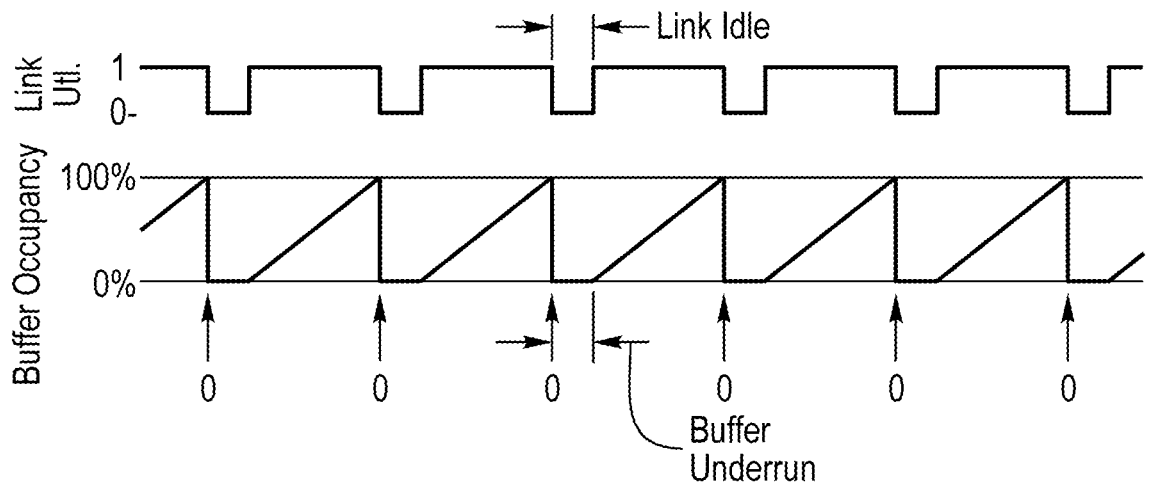
Figure 4:
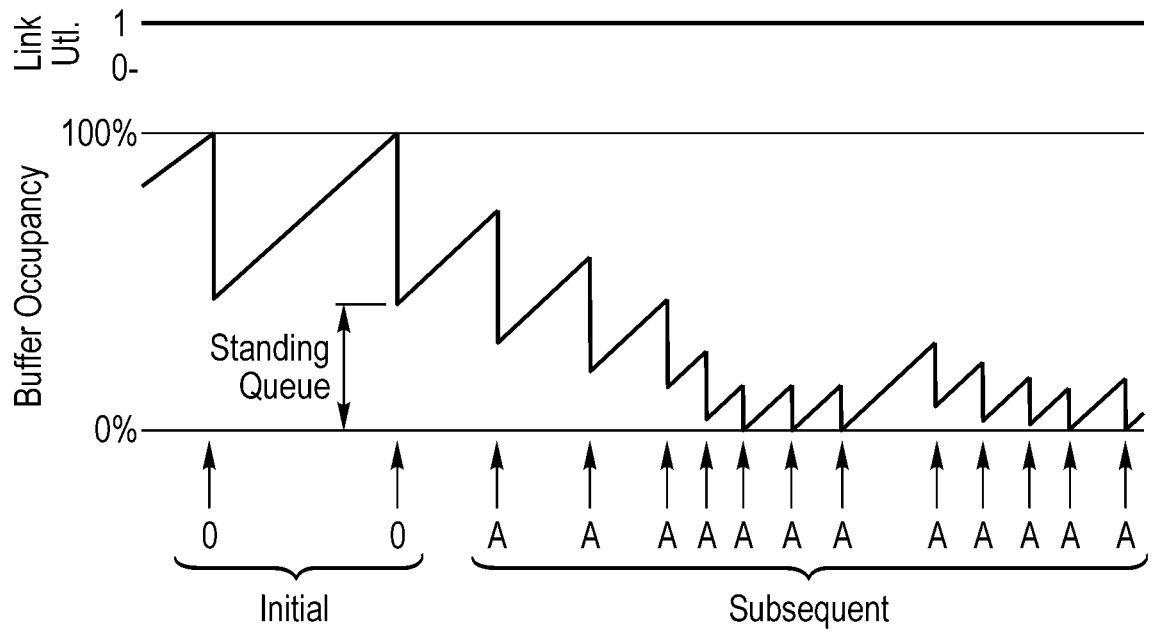
Figure 5:
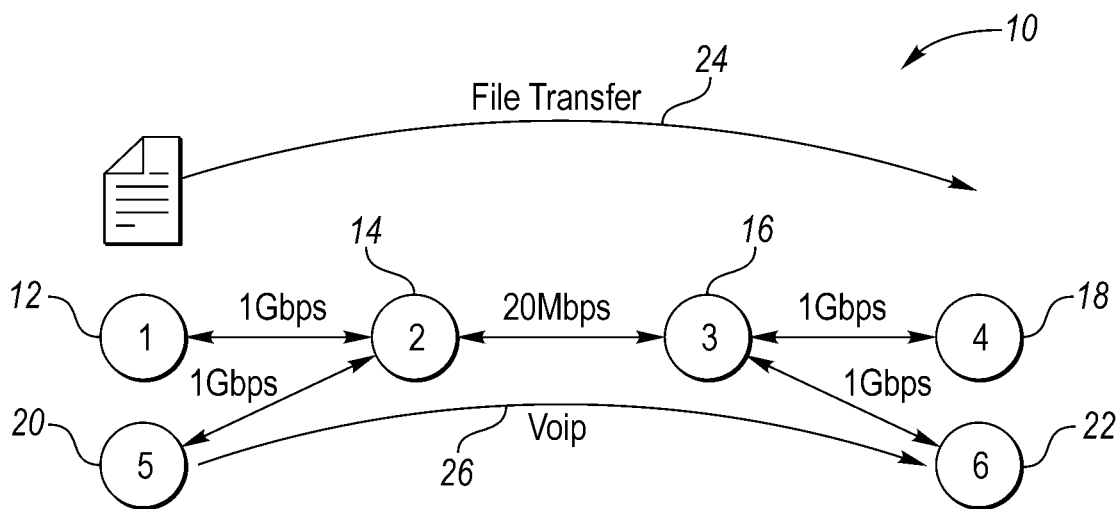
FIG. 5 illustrates a predictively managed system as contemplated by one non-limiting aspect of the present invention.

FIG. 5 illustrates a predictively managed system 10 in accordance with one non-limiting aspect of the present invention. The system 10 illustrates a plurality of network elements 12, 14, 16, 18, 20, 22 configured to facilitate exchanging signaling between themselves and/or devices (not shown) connected thereto or otherwise in communication therewith. One non-limiting aspect of the present invention relates to predictively managing buffering operations associated with one or more of the network elements 12, 14, 16, 18, 20, 22. The managed buffering operations are intended to encompass various processes and/or resources of the network elements utilized to facilitate packet transmissions. The term "buffering" has merely been selected to comply with nomenclature commonly used by one skilled in the art when referencing operations performed when devices facilitate exchanging packets according to the requirements of the Transmission Control Protocol (TCP). While TCP is predominantly described, the present invention is not necessarily so limited and fully contemplates its use and application with other packet control and/or delivery protocols, such as but not necessarily limited to User Datagram Protocol (UDP).

The system 10 illustrates a first connection 24 being used to facilitate a file transfer and a second connection 26 being used to facilitate a voice over Internet protocol (VoIP) phone call. The first connection 24 may be established according to TCP to facilitate exchanging packets between the first and fourth network elements, and the second connection 26 may be established according to UDP to facilitate exchanging packets between the fifth and sixth network elements 20, 22. The first and second connections 24, 26 are shown to be made based at least in part on communications exchange through second and third network elements. One or more links (double arrowed lines) may facilitate transmitting signaling between each of the network elements 12, 14, 16, 18, 20, 22 to enable communicating the packets associated with the first and second connections 24, 26. The links may correspond with any type of wired and/or wireless networks having capabilities sufficient to facilitate signaling sufficient for carrying packets between corresponding network elements. First, second, third and fourth links are shown to facilitate communicating packets at one gigabit per second (1 Gbps) and a fifth link is shown to facilitate commuting packets at 20 megabit per second (20 Mbps). The illustrated data rates are shown for exemplary, non-limiting purposes to demonstrate one aspect of the present invention with respect to managing buffering operations of a bottlenecked or other network element having link speeds slower than other links associated with the related connection, e.g., the second network element 14. While FIG. 5 illustrates a limited number of network elements (six) and a single bottlenecked network link (the fifth link), any number of additional network elements and links may be utilized to facilitate the connections 24, 26 and/or require the contemplated predictive management of buffering operations.

FIG. 5 illustrates a scenario where packet delay or time taken to facilitate delivering packets from a source to a destination, interchangeably referred to herein as packet latency, may be more relevant to one type of connection than another type of connection. Packet latency, for example, may be less relevant to the first connection 24 than the second connection 26 due to the file transfer being more tolerant of packet latency and the VoIP calls or other similarly sensitive transmissions being more intolerant of packet latency, e.g., web browsing, video chat, etc. may experience service interruption if packet latency becomes noticeable. One non-limiting aspect of the present invention contemplates distinguishing the type of traffic traveling through the connections 24, 26 and facilitating the contemplated predictive buffering based at least in part thereon, e.g., buffering may be predictively controlled to allow more latency for file transfers than for VoIP calls. Of course, it may be desirable in many situations to limit packet latency, limit standing queues or otherwise control packet transmissions such that the predictive buffering processes contemplated herein may be beneficial in facilitating buffering for any type of traffic without assessing the type of traffic being buffered.

Figure 6:
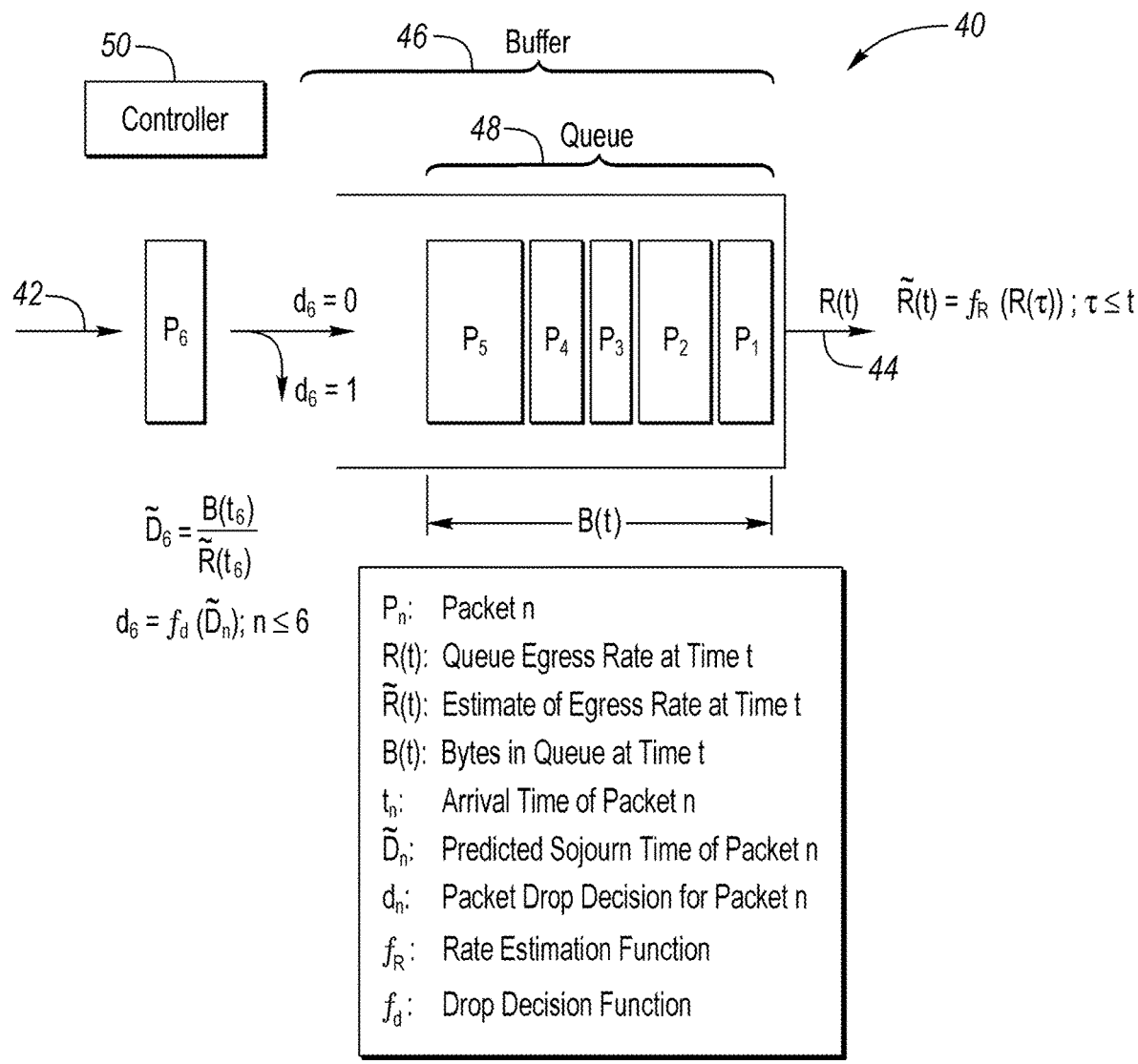
FIG. 6 illustrates a predictively managed network element in accordance with one non-limiting aspect of the present invention.

FIG. 6 illustrates a predictively managed network element 40 in accordance with one non-limiting aspect of the present invention. The network element 40 may correspond with the second network element 14 shown in FIG. 5 or any one of a plurality of network elements 12, 14, 16, 18, 20, 22 employed as a hop between a source and a destination endeavoring to transfer packets over a particular connection 24, 26, such as but not necessarily limited to a TCP connection. As network elements 40 (Ethernet switches, routers, modems, access points, etc.) may have varying configurations, sizes and operational capabilities, the basic operational capabilities common to many network elements are illustrated to include an input 42, an output 44, a buffer 46 and a queue 48. A controller 50 configured in accordance with the present invention to predictively manage buffering is shown to be associated with the network element 40, such as by being physically resident on the network element 40 or as a remote or standalone device having capabilities sufficient to facilitate transmitting commands or otherwise controlling buffering and/or other operations of the network element 40 associated with the predictive buffer management contemplated herein.

The controller 50 may include a plurality of instructions stored on a non-transitory computer-readable medium, which may be operable with a processor, to facilitate predictively managing buffering operations of the network element 40. The controller 50 may be configured to assess a size or capacity of the buffer 46 and to facilitate managing the amount of that capacity used to facilitate queuing packets according to the processes contemplated herein. The queue 48 may correspond with an amount of the buffer 46 capacity actually being used to queue packets for subsequent transmission from the output 44 as a part of a dequeuing processing, which is shown for exemplary purposes to comprise approximately 75% of the buffer 46 but may be more or less than that depend on desired and/or selectable operating conditions. The dequeuing process is predominately described herein with respect to delivering a packet from the queue 48 to a link associated with the output 44 but may also include a head drop process where a packet is dropped prior to being output to the link for transmission. As described below in more detail, the number of bytes or number of packets within the queue 48 at any one time may be controlled according to a drop decision function ($f_d$) where queue size is managed by dropping packets as part of an enqueuing process, referred to as a tail drop.

The dropping of packets as part of the enqueuing process may be more beneficial than dropping packets as part of the dequeuing process as it may alleviate the processing demands and resource consumptions associated with facilitating progression of a packet through an entire length of the queue 48 before being dropped. Furthermore, during the enqueuing process, the network element 50 may already perform multiple operations (such as administrative packet forward/drop decisions) to which the described packet dropping function could be added. Network elements typically do not perform such operations during the dequeuing process, and as a result the dequeuing process may be implemented in a highly optimized way that does not lend itself to the addition of packet dropping functions. The predictive management contemplated by one non-limiting aspect of the present invention may be characterized by tail dropping packets while being enqueued, i.e., before a packet is delivered to the queue 48 for subsequent dequeuing.

FIG. 6 illustrates an exemplary configuration where five packets ($P_1$, $P_2$, $P_3$, $P_4$, $P_5$) have been enqueued and a sixth packet ($P_6$) is in the process of being enqueued. The controller 50 may be configured to predictively manage the buffer 46 in accordance with the present invention by deciding whether to drop or not drop the incoming sixth packet, and subsequent packets, according to the drop decision function. The drop decision function may analyze a sojourn time ($\tilde{D}_6$) representative of an amount of time predicted for the sixth packet to travel through the queue 48. The sojourn time may be calculated based on a ratio of bytes currently in the queue (B(t)) and an estimated egress rate ($\tilde{E}(t)$) to predict travel time through the queue 48 before the sixth packet actually travels through the queue. In this manner, the predictive drop decision may be based on an estimated rate at which the packets already in the queue will be dequeued as a result of the expected link performance, and beneficially without having to timestamp or actually measure an amount of time taken for the sixth packet or any other packet to travel through the buffer/queue 46, 48.

The sojourn time, and thereby the drop decision, is shown to be at least partially dependent on an egress rate of the link expected to carry the sixth packet. The packets may transition through the queue 48 according to a first-in-first-out process such that the packets move sequentially from an input side of the queue to an output side of the queue before finally being dequeued. As the data rate or performance of the egress link may vary due to any number of network variables, the estimated egress rate may be used instead of a current or currently measured egress rate (R(t)). The estimated egress rate may be determined according to a rate estimation function ($f_R$) where prior egress rates may be factored to represent historical performance of the egress link over a selectable period of time, e.g., by averaging egress rates for a certain number of preceding packet transmissions, using a smoothed (IIR) estimate of the egress rate during intervals when the queue is busy or, in the case where the egress rate is controlled by the network element itself using token bucket rate shaping parameters, the configuration and state of the token bucket rate shaper. The rate estimation function may be coupled with the sojourn time to facilitate the drop or not drop decision of the drop decision function. As shown, the sixth packet may be thereby dropped before entering the queue 48 ($d_6$ shown with a value of "1") or not dropped and allowed to enter the queue 48 ($d_6$ shown with a value of "0").

The drop decision function may include assessing the sojourn time or other predicted measure of travel relative to a corresponding threshold, which is described in one non-limiting aspect of the present invention as being a sojourn threshold. The sojourn threshold may be calculated by the drop decision function according to any number of variable and desired operating characteristics of the buffer, the egress link and/or other influences, such as round trip time (RTT), etc. The sojourn threshold, for example, may be set to 5 ms or other time value believed to be beneficial in balancing the need for dropping packets, thereby instigating TCP congestion control capabilities of a source of the packet, versus a need to achieve desired link utilization levels. Optionally, the drop decision function may include additional steps and/or processes when deciding whether to drop or not drop a packet in addition requiring the sojourn threshold to be surpassed. One such addition may relate to entering a drop state or pending state where the sixth packet and/or some number of packets exceeding the threshold are not immediately dropped and instead are monitored for a period of time to insure the sojourn threshold is surpassed for a sufficient period before dropping actually commences.

One non-limiting aspect of the present invention contemplates implementing the drop decision function by leveraging use of the CoDel AQM process for making head-drop decisions, but instead of making head drops, the drop decision function may employ the same logic for making tail drops (dropping before entering queue 48). This may include using predicted sojourn time instead of measured sojourn time, optionally on a per-packet basis for each packet, and comparing the predicted sojourn time to a threshold (e.g. 5 ms). If the predicted sojourn time remains below threshold, or drops below the threshold at least once every interval (e.g. 100 ms), the drop decision function does not trigger any packet drops. If the predicted sojourn time exceeds the threshold, and remains above threshold for an interval (100 ms), the drop decision function enters the drop-state. Upon entering the drop-state, the drop decision function triggers a single packet drop. As long as the predicted sojourn time remains above threshold, the drop decision function remains in the drop-state and will trigger further packet drops at a rate that increases with time. For example, the time interval between triggered packet drops may progress according to 1/(interval*sqrt(N)), where interval is 100 ms, sqrt( ) is the square-root function, and N is the count of packet drops during this drop-state period. Once the predicted sojourn time falls below threshold, the drop decision function exits the drop-state, and packet drops cease. If the drop decision function re-enters the drop-state shortly after having exited the drop-state, the count of packet drops is not reset to 1, but instead is decremented slightly (e.g. by 2) from its final value on the previous drop-state period.

One non-limiting aspect of the present invention contemplates implementing the drop decision function according to fuzzy logic, thereby enabling management of the queue using a fuzzy logic algorithm to control TCP flows via adjusting the packet drop rate in response to changes in queuing latency. The packet drop rate is predominantly described with respect to dropping packets prior to being enqueued (tail drop), however, the present invention is not necessarily so limited and fully contemplates the fuzzy logic algorithm being utilized to facilitate head dropping packets. In the case of head dropping packets, certain parameters may be calculated based on actual values instead of the predictions, e.g., actual sojourn time generated by time stamping packets may be utilized instead of the predictive/estimated sojourn time described above. The network element may be used to monitor per-packet queuing latency as a metric to evaluate congestion, and packet drops (or potentially ECN markings) to control the rate of the TCP connections that traverse the device. The drop decision function may use a fuzzy logic controller that processes inputs relating to the queuing latency (such as the current queuing latency, the recent history of queuing latency, the rate of change in queuing latency, the amount of time that queuing latency has remained above a certain threshold, etc.) to produce an output in the form of a drop probability (or drop rate) that is used to determine which packets will be forwarded, and which will be dropped (or ECN marked).

The long-term-average rate for a single steady-state TCP session may be approximately inversely proportional to the square root of the drop probability (but also dependent on the packet size and round-trip time for the connection). However, the network element may in general be supporting a constantly varying number of TCP connections in various states of their congestion control algorithm and with various RTTs, so simply selecting an appropriate drop probability to achieve a TCP rate matching the egress link is a practical impossibility. Thus, the function of the fuzzy logic drop decision function may be to adjust the drop probability and monitor its effect on queuing latency with the goal of maintaining a busy egress link with the minimum amount of queuing latency. While it is conceivable for the network element to track the number of simultaneous TCP connections that it is supporting, it is much more difficult for it to estimate the RTT for each connection, or to determine which TCP implementation each is, or in which phase of the congestion control process each connection is. Thus, the ingress traffic rate (as driven by multiple sources that predominantly use TCP) may be modeled as a time-varying non-linear system that responds in a complex way that is generally inversely related to the packet drop probability.

Figure 7:
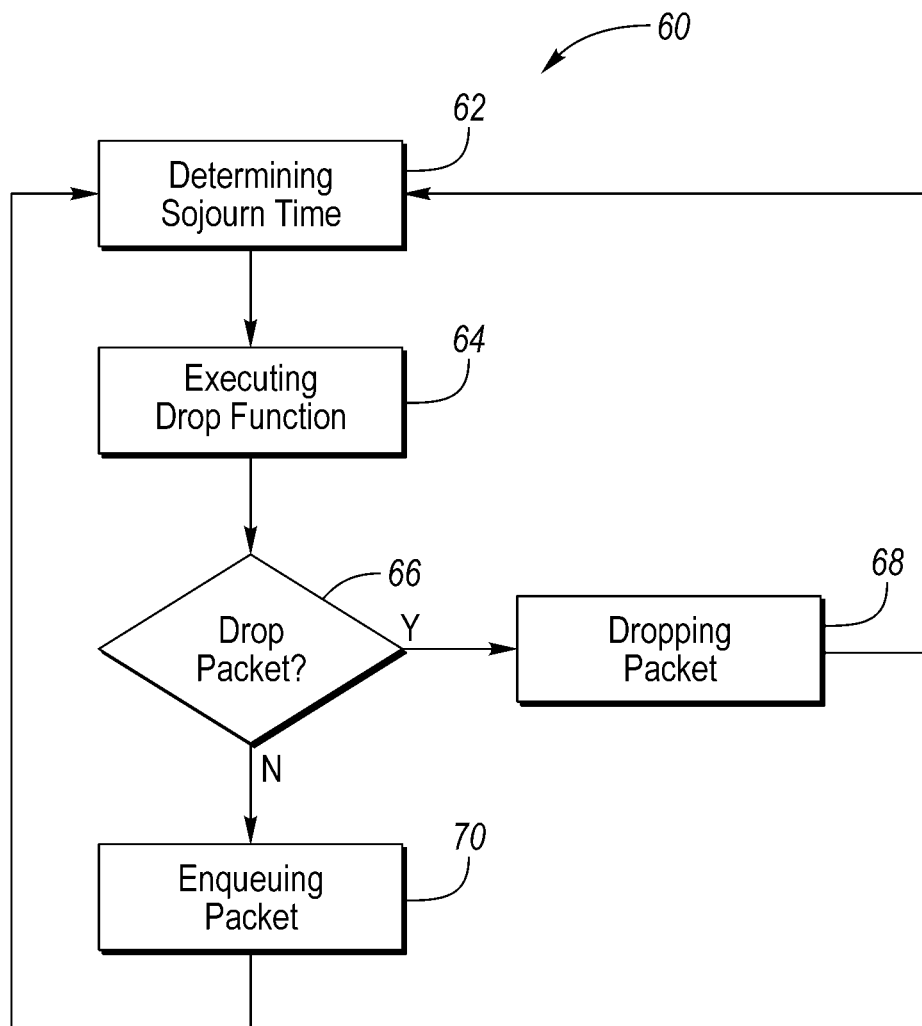
FIG. 7 illustrates a flowchart of a method for predictively managing a network buffer in accordance with one non-limiting aspect of the present invention.

FIG. 7 illustrates a flowchart 60 of a method for predictively managing a network buffer in accordance with one non-limiting aspect of the present invention. The method may be embodied in a non-transitory computer-readable medium having computer-readable instructions stored therein, operable with the processor, to facilitate the predictive managing contemplated herein. Block 62 relates to determining a sojourn time of a packet arriving at the network buffer. The sojourn time may be predicted on a per packet basis, i.e., when each packet arrives, to estimate the amount of time needed for the arriving packet to travel through a queue of the network buffer. Blocks 64 and 66 relate to executing a drop decision function, such as but not necessary limited to one of the drop decision functions described above, and as a function thereof determining whether the arriving packet should be dropped or not dropped before entering the queue. Block 68 relates to determining the arriving packet should be dropped and performing a related operation sufficient to prevent enqueuing the arriving packet. Block 70 to determining the arriving packet should not be dropped and performing an enqueuing operation sufficient to add the arriving packet to the queue. This process may be repeated as each packet arrives to provide per-packet prediction of sojourn time, per-packet drop decisions and/or multiple packet drop management (e.g., entering/exiting drop state).

One non-limiting aspect of the present invention allows the buffer to be sized to be large relative to the BDP, thus ensuring optimal TCP performance and the ability to handle traffic bursts, but eliminates the standing queue that is the side-effect of the loss-based TCP congestion control algorithm. This algorithm could be applicable to a wide range of network devices. It provides value for network devices that serve links that are typically bottlenecks, such as access network devices. As noted above, AQM may be used in the measurement of the per-packet queuing latency and the use of these measurements to produce a packet drop rate based upon a control law that takes as its input the sojourn time. As supported above, the fuzzy logic contemplated herein, which may be facilitated with the controller or a fuzzy logic controller, may offer an advantage over linear and state-space control algorithms in that the fuzzy logic does not require the controlled system be describable by a linear transfer function and/or as a transfer function. The fuzzy logic controller may be easily implemented and excel at dealing with systems that are complex, ill-defined or time-varying, such as the system described above.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for managing a network element including at least a first buffer and a second buffer, the first buffer including a first queue, the second buffer including a second queue, each of the first queue and the second queue correspondingly enqueuing packets at an input and to dequeuing packets at an output, the method comprising:
    predicting sojourn time for each packet prior to being enqueued into one of the first queue and the second queue, the sojourn time estimating time needed for the corresponding packet to travel through one of the first queue and the second queue; and
    one of dropping and not dropping each packet based at least in part on the corresponding sojourn time.

2. The method of claim 1 further comprising:
    determining to drop and not drop each packet prior to being enqueued to the first queue based on a comparison of the corresponding sojourn time to a first sojourn threshold, including dropping packets having sojourn times greater than the first sojourn threshold and enqueuing packets having sojourn times less than or equal to the first sojourn threshold; and
    determining to drop and not drop each packet prior to being enqueued to the second queue based on a comparison of the corresponding sojourn time to a second sojourn threshold, including dropping packets having sojourn times greater than the second sojourn threshold and enqueuing packets having sojourn times less than or equal to the first sojourn threshold.

3. The method of claim 1 further comprising directing the packets having a first marking to the first queue and the packets having a second marking to the second queue, the first marking distinguishing traffic associated therewith from traffic associated with the second marking.

4. The method of claim 3 further comprising setting the first sojourn threshold to be less than the second sojourn threshold so as to provide the first queue with a lower latency than the second queue.

5. The method of claim 4 further comprising setting a difference between the first sojourn threshold and the second sojourn threshold in proportion to a difference between a size of the first queue and a size of the second queue.

6. The method of claim 1 further comprising:
predicting a latency tolerance for the packets according to being classifieds as one of a first type and a second type; and
directing the packets of the first type to the first queue and the packets of the second type to the second queue.

7. The method of claim 1 further comprising:
measuring queue time for the packets permitted enqueuing, the queue time measuring actual time within the corresponding one of the first queue and the second queue; and
head dropping the packets having the queue time above a queue threshold, the head dropping resulting in the corresponding packets being dropped prior to transport from the network buffer.

8. A network element comprising:
separate queues for queueing packets for subsequent transport over a link;
a controller having non-transitory computer-readable medium with a plurality of instructions executable with a processor to facilitate to managing packet drops, the plurality of instructions being sufficient for:
i) calculating a sojourn time for packets prior to the corresponding packets entering one of the queues, each sojourn time estimating time needed for the corresponding packets to travel through an entirety of the corresponding queue before being dequeued; and
ii) one of dropping and not dropping the packets depending on the sojourn time associated therewith, including dropping the packets having the sojourn time above a corresponding sojourn threshold and not dropping the packets having the sojourn time equal to or less than the corresponding sojourn threshold.

9. The network element of claim 8 wherein the plurality of instructions are sufficient for tail dropping the packets having the sojourn time greater than the corresponding sojourn threshold, the tail dropping resulting in the corresponding packets being dropped prior to entering one of the queues.

10. The network element of claim 8 wherein the plurality of instructions are sufficient for head dropping the packets having the sojourn time less than the corresponding sojourn threshold, the head dropping resulting in the corresponding packets being dropped after entering one of the queues and prior to transport over the link.

11. The network element of claim 8 wherein the plurality of instructions are sufficient for:
determining the sojourn times as a ratio of a number of bytes in the corresponding queue relative to an egress rate of the link;
tail dropping the packets having the sojourn time above the corresponding sojourn threshold;
measuring queue time for the packets permitted entry into one of the queues, the queue time measuring actual time within the corresponding queue for the corresponding packets; and
head dropping the packets having the queue time above a queue threshold.

12. A method for managing packet drop for a network element interfacing multiple connections with a bottleneck link, the method comprising:
characterizing packets arriving at the network element as one of a first type and a second type;
directing packets of the first type to a first queue of the network element, the first queue having a first size; and
directing packets of the second type to a second queue of the network element, the second queue having a second size greater than the first size.

13. The method of claim 12 further comprising:
managing packet drop for the first queue according to a first threshold whereby packets directed thereto are one of dropped or not dropped depending on whether a sojourn time associated therewith exceeds the first threshold; and
managing packet drop for the second queue according to a second threshold whereby packets directed thereto are one of dropped or not dropped depending on whether a sojourn time associated therewith exceeds the second threshold.

14. The method of claim 13 further comprising calculating the sojourn time for each of the packets as a ratio of a number of bytes in the directed towards one of the first queue and the second queue and an egress rate of the bottleneck link.

15. The method of claim 13 further comprising calculating the sojourn time for each of the packets to reflect a predicted amount of time for the corresponding packet to travel through an entirety of the directed towards one of the first queue and the second queue.

16. The method of claim 13 further comprising tail dropping the packets exceeding the corresponding one of the first threshold and the second threshold prior to being enqueued into one of the first queue and the second queue.

17. The method of claim 12 further comprising determining the packets to be of the first type or the second type depending a presence and/or an absence of a marking included therewith.

18. The method of claim 17 further comprising determining the latency sensitivity of the packets depending on a marking and/or a type associated therewith.

19. The method of claim 12 further comprising determining the packets to be of the first type when including a first marking and of the second type when including a second marking.

* * * * *